(12) United States Patent
Noonan et al.

(10) Patent No.: US 10,753,322 B1
(45) Date of Patent: Aug. 25, 2020

(54) DIRECT DRIVE ASPIRATION SYSTEM

(71) Applicant: DEERE & COMPANY, Moline, IL (US)

(72) Inventors: James T. Noonan, Bondurant, IA (US); Shaun J. Miller, Woodward, IA (US); Dwayne B. Watt, Bartlesville, OK (US); Cecil H. Wise, Jr., Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/274,736

(22) Filed: Feb. 13, 2019

(51) Int. Cl.
| | |
|---|---|
| *B60K 13/02* | (2006.01) |
| *F02M 35/08* | (2006.01) |
| *F02M 35/16* | (2006.01) |
| *A01D 41/12* | (2006.01) |

(52) U.S. Cl.
CPC .......... *F02M 35/086* (2013.01); *B60K 13/02* (2013.01); *F02M 35/164* (2013.01); *A01D 41/1252* (2013.01)

(58) Field of Classification Search
CPC .... F02M 35/086; F02M 35/08; F02M 35/164; F02M 35/16; A01D 41/1252; B60K 13/02
USPC ...................................... 180/68.1, 68.2, 68.3
See application file for complete search history.

(56) References Cited

U.S. PATENT DOCUMENTS

| | | | | |
|---|---|---|---|---|
| 6,588,524 | B2 * | 7/2003 | Keen | B60K 25/02 123/198 E |
| 9,273,649 | B2 * | 3/2016 | Gomez | F02M 35/09 |
| 2008/0178592 | A1 * | 7/2008 | Bering | F02M 35/08 60/605.1 |
| 2010/0071978 | A1 * | 3/2010 | Kisse | F02M 35/022 180/68.2 |
| 2012/0167857 | A1 * | 7/2012 | Barnes | B60W 10/06 123/198 R |

FOREIGN PATENT DOCUMENTS

| | | |
|---|---|---|
| AU | 717481 B2 | 1/2000 |
| WO | 2000076294 A2 | 12/2000 |

* cited by examiner

*Primary Examiner* — John D Walters
(74) *Attorney, Agent, or Firm* — Taft Stettinius & Hollister LLP; Stephen F. Rost

(57) ABSTRACT

Systems for harvesting machines, transmissions for harvesting machines, and methods of operating systems for harvesting machines are disclosed herein. A system includes a drive unit, a cleaner unit, an aspirator, and a transmission. The drive unit is configured to produce rotational power in use of the system. The cleaner unit is fluidly coupled to the drive unit and configured to separate debris from air so that the air becomes cleaned air and provide the cleaned air to the drive unit in use of the system. The aspirator is fluidly coupled to the cleaner unit and configured to draw debris away from the cleaner unit and exhaust the debris in use of the system. The transmission is coupled to the drive unit and the aspirator.

20 Claims, 5 Drawing Sheets

DIRECT DRIVE ASPIRATION SYSTEM

FIELD OF THE DISCLOSURE

The present disclosure relates, generally, to drive systems, and, more specifically, to drive systems incorporating aspirators.

BACKGROUND

In some cases, an aspirating device may be used to draw matter away from one or more components that are included in, or otherwise coupled to, a drive system. Some aspirating devices include induction systems that may be associated with undesirable pressure and/or heat transfer characteristics. Other aspirating devices may be associated with excessive cost, require space that may be occupied or limited by other devices, necessitate a design specific for a particular engine configuration, and/or demand undesirable maintenance and servicing. Provision of an aspirating device that avoids the aforementioned drawbacks, as well as a mechanism to drive operation of such a device, remains an area of interest.

SUMMARY

The present disclosure may comprise one or more of the following features and combinations thereof.

According to one aspect of the present disclosure, a system for a harvesting machine may include a drive unit, a cleaner unit, an aspirator, and a transmission. The drive unit may be configured to produce rotational power in use of the system. The cleaner unit may be fluidly coupled to the drive unit and configured to separate debris from air so that the air becomes cleaned air and provide the cleaned air to the drive unit in use of the system. The aspirator may be fluidly coupled to the cleaner unit and configured to draw debris away from the cleaner unit and exhaust the debris in use of the system. The transmission may be coupled to the drive unit and the aspirator to receive rotational power produced by the drive unit and provide the rotational power to the aspirator. The transmission may include an aspirator driver configured to drive operation of the aspirator at a fixed speed ratio in use of the system.

In some embodiments, the aspirator may include a shaft that extends along a central axis and a rotor supported on the shaft and configured for rotation about the central axis to draw the debris away from the cleaner unit, and the aspirator driver may include an aspirator gear coupled to the shaft to drive rotation of the rotor about the central axis in use of the system. The transmission may include an input shaft coupled to the drive unit to receive rotational power produced by the drive unit, a first gear supported on the input shaft, and a second gear arranged between the first gear and the aspirator gear. The aspirator gear may be intermeshed with the second gear. The second gear may be intermeshed with the first gear. The system may be operable in a first operating mode in which rotation of the first gear drives rotation of the aspirator gear through the second gear to cause rotation of the rotor about the central axis. The system may be operable in a second operating mode in which the aspirator gear does not drive rotation of the rotor about the central axis.

In some embodiments, the system may include a main housing that houses the transmission, the aspirator may include a case and an exhaust duct integrally formed with the case, and the case may be directly attached to the main housing to facilitate exhaustion of the debris through the exhaust duct away from the main housing in use of the system. The case may be directly attached to the main housing to minimize physical interference between the aspirator and one or more auxiliary components that may be driven by the drive unit.

In some embodiments, the aspirator driver may be beltless. The aspirator driver may be configured to drive operation of the aspirator at a fixed speed ratio in use of the system without one or more auxiliary pads.

According to another aspect of the present disclosure, a transmission for a harvesting machine may include an input shaft, an output shaft, a first gear, a second gear, and a third gear. The input shaft may be configured to receive rotational power produced by a drive unit, and the input shaft may be configured for rotation about an input axis in use of the transmission. The output shaft may be configured to transmit rotational power received by the input shaft to an aspirator to drive rotation thereof, the output shaft may be configured for rotation about an output axis in use of the transmission, and the output axis may be spaced from the input axis. The first gear may be supported on the input shaft and configured for rotation about the input axis in use of the transmission. The second gear may be configured for rotation about a second axis in use of the transmission, and the second axis may be spaced from the input axis and the output axis. The third gear may be supported on the output shaft and configured for rotation about the output axis to drive rotation of the aspirator in use of the transmission.

In some embodiments, the second gear and the third gear may be intermeshed. The first gear and the second gear may be intermeshed. The transmission may be operable in a first operating mode in which rotation of the first gear about the input axis drives rotation of the third gear about the output axis through the second gear to drive rotation of the aspirator. The transmission may be operable in a second operating mode in which the third gear does not drive rotation of the aspirator. The first operating mode may be a runtime operating mode of the transmission, and the second operating mode may be a startup operating mode of the transmission.

According to yet another aspect of the present disclosure, a method of operating a system for a harvesting machine that includes a drive unit configured to produce rotational power, a cleaner unit fluidly coupled to the drive unit and configured to separate debris from air so that the air becomes cleaned air and provide the cleaned air to the drive unit, an aspirator fluidly coupled to the cleaner unit and configured to draw debris away from the cleaner unit and exhaust the debris, and a transmission coupled to the drive unit and the aspirator to receive rotational power produced by the drive unit and provide the rotational power to the aspirator may include operating the system in a startup mode and operating the system in a runtime mode after operating the system in the startup mode. Operating the system in the runtime mode may include driving operation of the aspirator by an aspirator gear of the transmission at a fixed speed ratio.

In some embodiments, the transmission may include a first gear supported on an input shaft, the aspirator gear supported on an output shaft that is spaced from the input shaft, and a second gear arranged between the first gear and the aspirator gear, and operating the system in the runtime mode may include operating the system such that the first gear drives rotation of the aspirator gear through the second gear to drive operation of the aspirator. Operating the system in the startup mode may include operating the system such that the aspirator gear does not drive operation of the aspirator.

These and other features of the present disclosure will become more apparent from the following description of the illustrative embodiments.

BRIEF DESCRIPTION OF THE DRAWINGS

The disclosure described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
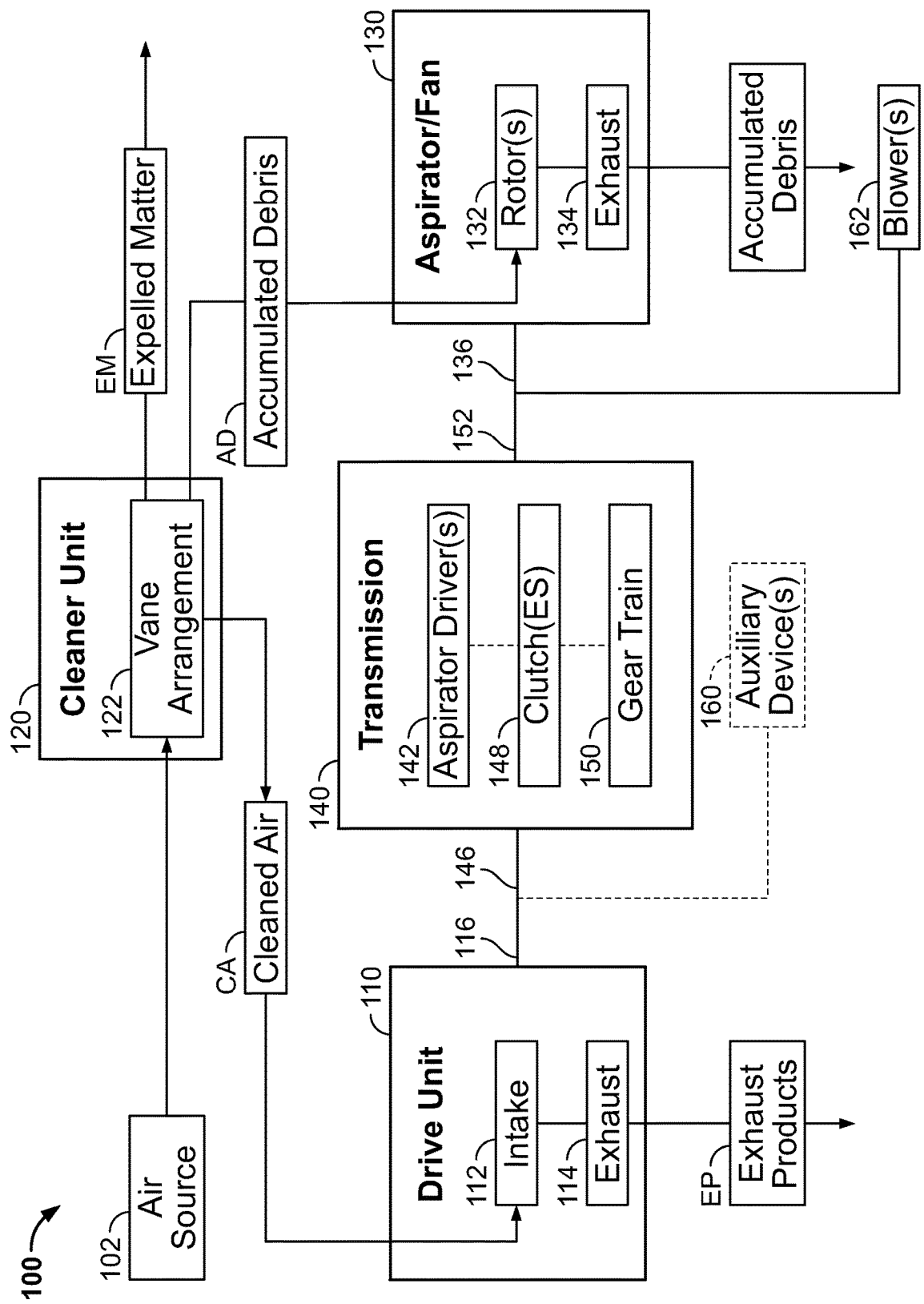
FIG. 1 is a diagrammatic view of a drive system that includes a drive unit, a cleaner unit fluidly coupled to the drive unit, an aspirator fluidly coupled to the cleaner unit, and a transmission coupled to the drive unit and the aspirator to drive operation of the aspirator.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

Embodiments of the disclosure may be implemented in hardware, firmware, software, or any combination thereof. Embodiments of the disclosure implemented in a computer system may include one or more bus-based interconnects or links between components and/or one or more point-to-point interconnects between components. Embodiments of the disclosure may also be implemented as instructions carried by or stored on a transitory or non-transitory machine-readable medium, which may be read and executed by one or more processors. A machine-readable medium may be embodied as any device, mechanism, or physical structure for storing or transmitting information in a form readable by a machine (e.g., a computing device). For example, a machine-readable medium may be embodied as read only memory (ROM); random access memory (RAM); magnetic disk storage media; optical storage media; flash memory devices; mini- or micro-SD cards, memory sticks, electrical signals, and others.

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In general, schematic elements used to represent instruction blocks may be implemented using any suitable form of machine-readable instruction, such as software or firmware applications, programs, functions, modules, routines, processes, procedures, plug-ins, applets, widgets, code fragments and/or others, and that each such instruction may be implemented using any suitable programming language, library, application programming interface (API), and/or other software development tools. For example, some embodiments may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative drive system 100 is included in, or otherwise adapted for use with, a harvesting machine. The drive system 100 is embodied as, or otherwise includes, a collection of devices cooperatively configured to drive operation of one or more components of the harvesting machine. In the illustrative embodiment, the drive system 100 includes a drive unit 110, a cleaner unit 120 fluidly coupled to the drive unit 110, an aspirator or fan 130 fluidly coupled to the cleaner unit 120, and a transmission 140 coupled to the drive unit 110 and the aspirator 130.

The illustrative drive unit 110 is configured to produce rotational power in use of the drive system 100. The illustrative cleaner unit 120 is configured to separate debris from air so that the air becomes cleaned air CA and provide the cleaned air CA to the drive unit 110 in use of the drive system 100. The illustrative aspirator 130 is configured to draw accumulated debris AD away from the cleaner unit 120 and the exhaust the accumulated debris AD in use of the drive system 100. The illustrative transmission 140, which is coupled to the drive unit 110 and the aspirator 130 to receive rotational power produced by the drive unit 110 and provide the rotational power to the aspirator 130, includes an aspirator driver 142 configured to drive operation of the aspirator 130 at a fixed speed ratio in use of the drive system 100. As described in greater detail below, the aspirator driver 142 includes an aspirator gear 442 (see FIG. 4) configured to drive rotation of at least one rotor 132 of the aspirator 130 at a fixed speed ratio in use of the drive system 100.

As will be apparent from the discussion that follows, the transmission 140 may be configured to drive operation of the aspirator 130 at a fixed speed ratio in use of the illustrative drive system 100 without a belt, chain, or auxiliary pad. Consequently, the illustrative transmission 140 may avoid the tensioning and servicing complications associated with configurations incorporating one or more belts and/or chains, as well as the cost associated with configurations incorporating one or more auxiliary pads having speed-up mechanisms. Because the illustrative transmission 140 may be configured to drive operation of the aspirator 130 without an auxiliary pad, one or more auxiliary pads may be dedicated to other applications, such as driving one or more pumps, compressors, or the like, for example.

In addition, the illustrative transmission 140 (or at least the aspirator driver 142) may be capable of driving operation of the aspirator 130 at a fixed speed ratio regardless of the size and/or emission tier level of the drive unit 110. The transmission 140 may therefore be adapted for use over a wide range of engine platforms. As a result, the illustrative transmission 140 may provide, or otherwise be associated with, a greater degree of simplicity during manufacturing and/or assembly operations than other configurations.

In use of the illustrative drive system 100, due to the step-up in speed ratio that may be achieved by, or may otherwise be associated with, the transmission 140, relatively-low power and high speed demands of the aspirator 130 may be met in a cost effective and efficient fashion. The step-up in speed ratio achieved by, or otherwise associated with, the transmission 140 may be adequate to operate the rotor 132 of the aspirator 130 at speeds in excess of 6000 rpm, at least in some cases. In such cases, other transmission configurations (e.g., configurations incorporating one or more belts, chains, and/or auxiliary pads instead of the illustrative driver 142) may not achieve the step-up in speed ratio needed to operate the aspirator 130. Even in situations of relatively-low speed rotational power output by the drive unit 110, the step-up ratio achieved by, or otherwise associated with, the transmission 140 may be adequate to operate the aspirator 130 to attain acceptable removal of accumulated debris AD from the cleaner unit 120.

In the illustrative embodiment, the drive system 100 is included in, or otherwise adapted for use with, a cotton harvesting machine such as the CP690 Cotton Picker or the CS690 Cotton Stripper manufactured by John Deere, for example. Of course, it should be appreciated that the illustrative drive system 100 is not limited to agriculture applications and may be used in lawn and garden, construction, landscaping and ground care, golf and sports turf, forestry, engine and drivetrain, and government and military applications, for example. Accordingly, in some embodiments, the drive system 100 of the present disclosure may be included in, or otherwise adapted for use with, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

The illustrative drive unit 110 is embodied as, or otherwise includes, any device or collection of devices capable of producing rotational power in use thereof. In some embodiments, the drive unit 110 may be embodied as, or otherwise include, a 13.5 liter diesel engine compliant with Tier 4 emission standards. In any case, among other things, the drive unit 110 includes an intake 112, an exhaust 114, and a drive unit output shaft 116. The intake 112 is fluidly coupled to the cleaner unit 120 and configured to receive cleaned air CA therefrom. The exhaust 114 is fluidly coupled to the intake 112 and configured to expel exhaust products EP from the drive unit 110. The drive unit output shaft 116 outputs rotational power produced by the drive unit 110 during each operational cycle. Of course, it should be appreciated that each operational cycle of the drive unit 110 may include a number of distinct operating phases, such as intake, compression, combustion, and exhaust, for example.

The illustrative cleaner unit 120 is embodied as, or otherwise includes, any device or collection of devices capable of separating debris from air supplied thereto so that the air becomes cleaned air CA and providing the cleaned air CA to the intake 112 of the drive unit 110 in use thereof. Air is illustratively supplied to the cleaner unit 120 by an air source 102. In some embodiments, the air source 102 may be embodied as, or otherwise include, an ambient air source capable of supplying ambient air to the cleaner unit 120. In any case, the cleaner unit 120 includes a vane arrangement 122 (e.g., a collection of rotatable vanes) operable to remove debris, particulates, and/or contaminates from air supplied by the air source 102 by vortex or cyclonic separation such that the debris, particulates, and/or contaminates may be expelled from the cleaner unit 120 as expelled matter EM. That being said, it should be appreciated that during operation of the cleaner unit 120, debris not expelled from the cleaner unit 120 may build up therein as accumulated debris AD.

The illustrative aspirator 130 is embodied as, or otherwise includes, any device or collection of devices capable of drawing accumulated debris AD away from the cleaner unit 120 and exhausting the accumulated debris AD in use thereof. In the illustrative embodiment, the aspirator 130 is embodied as, or otherwise includes, a centrifugal fan or blower. In other embodiments, however, the aspirator 130 may be embodied as, or otherwise include, another suitable device. In any case, the aspirator 130 includes one or more rotors or impellers 132, an exhaust 134 fluidly coupled to the one or more rotors 132, and an aspirator input shaft 136 coupled to the transmission 140 that supports the one or more rotors 132. As further discussed below, the one or more rotors 132 are configured for rotation to draw accumulated debris AD to the exhaust 134 for exhaustion thereby.

In some embodiments, such as embodiments in which the one or more rotors 132 include multiple rotors supported on the aspirator input shaft 136, for example, the multiple rotors may be spaced from one another and arranged in separate chambers (not shown) of the aspirator 130. In such embodiments, baffles, partitions, dividers, separators, or the like may cooperate with one another and/or a housing of the aspirator 130 to define the separate chambers. Additionally, in such embodiments, the exhaust 134 may include a manifold, distribution chamber, plenum, collection of ducts, or the like that is fluidly coupled to the chambers and configured to exhaust accumulated debris AD drawn into the chambers by the rotors 132.

The illustrative transmission 140 is embodied as, or otherwise includes, any device or collection of devices capable of transmitting rotational power produced by the drive unit 110 to the aspirator 130 to drive operation thereof. In the illustrative embodiment, the transmission 140 includes one or more aspirator drivers 142, a transmission input shaft 146, one or more clutches 148, gear train 150, and a transmission output shaft 152, among other things as described in greater detail below. The transmission input shaft 146 is coupled to the drive unit output shaft 116 to receive rotational power output by the drive unit output shaft 116. The one or more clutches 148 are selectively engageable and disengageable to rotationally couple or de-couple the transmission input shaft 146 to or from one or more components of the gear train 150 (the rotational coupling, or lack thereof, between the aspirator driver(s) 142, the one or more clutches 148, and the gear train 150 is depicted in phantom in FIG. 1). The one or more aspirator drivers 142 are coupled to the aspirator input shaft 136 to provide rotational power thereto to drive operation of the aspirator 130, as further discussed below.

In some embodiments, such as embodiments in which the one or more rotors 132 include multiple rotors supported on the aspirator input shaft 136, for example, the aspirator driver 142 may include multiple aspirator drivers. In such embodiments, each aspirator driver 142 may be configured to drive operation of one corresponding rotor 132 at a fixed speed ratio. Additionally, in such embodiments, the aspirator drivers 142 may be configured to drive operation of the corresponding rotors 132 independently of one another at fixed speed ratios distinct from one another.

In the illustrative embodiment, the transmission 140 is configured to transmit rotational power produced by the drive unit 110 to one or more blowers 162 coupled thereto to drive operation of the one or more blowers 162 in use of the drive system 100. To that end, the transmission 140 is coupled to the one or more blowers 162 via an output shaft 262 (see FIG. 2). The one or more blowers 162 are illustratively embodied as, or otherwise include, fans included in a cotton harvester such as a cotton picker or a cotton stripper, for example. Of course, in other embodiments, it should be appreciated that the one or more blowers 162 may be embodied as, or otherwise include, another suitable device or collection of devices.

In some embodiments, one or more auxiliary devices 160 may be coupled to the drive unit output shaft 116 and driven by the drive unit 110. The one or more auxiliary devices 160 may each be embodied as, or otherwise include, any device separate from the transmission 140 and the aspirator 130 that may be driven by the drive unit 110. For example, the one or more auxiliary devices 160 may be embodied as, or otherwise include, one or more pumps, power take-off (PTO) gears, drives, or systems, accessory drives, implement drives, cranks, shafts, belts, pulleys, or the like. In any case, it should be appreciated that in some embodiments, the one or more auxiliary devices 160 may be omitted (as indicated by the depiction of the coupling, or lack thereof, between the shaft 116 and the device(s) 160 in phantom).

Figure 2:
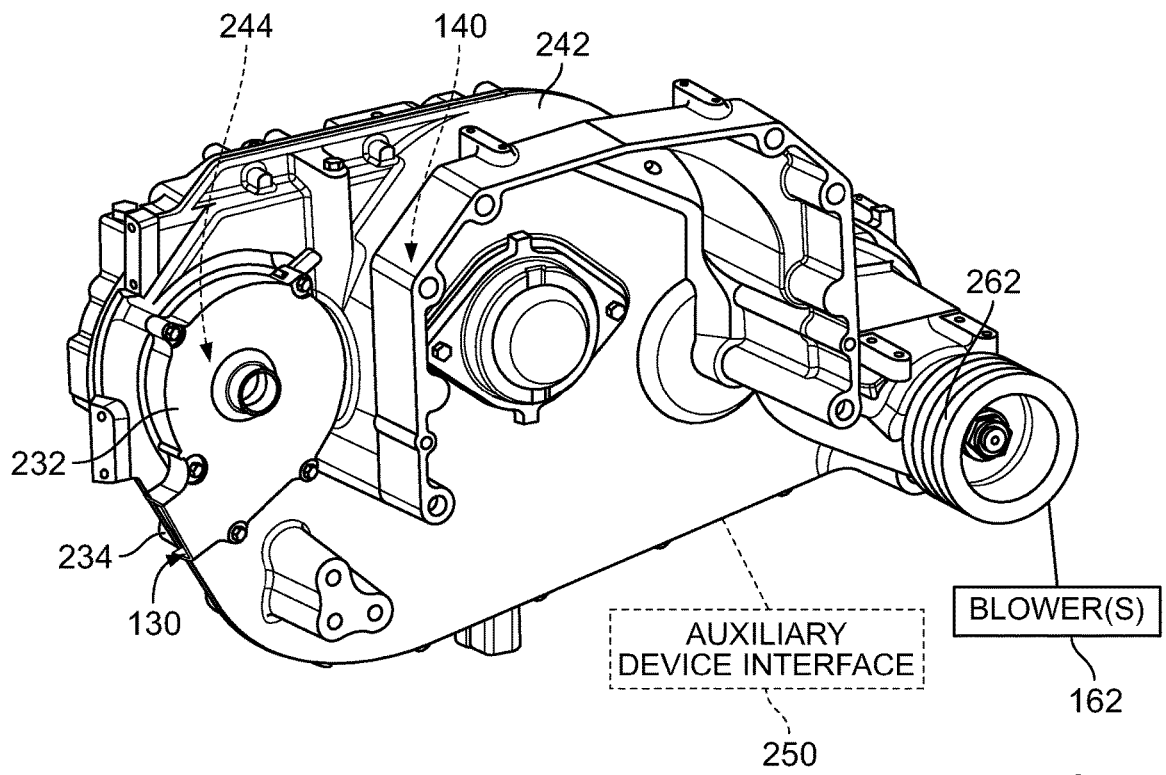
FIG. 2 is a perspective view of a main housing that houses the transmission diagrammatically depicted in FIG. 1 and a case attached to the main housing that contains the aspirator diagrammatically depicted in FIG. 1.

Referring now to FIG. 2, the illustrative drive system 100 includes a main housing 242 that houses various components included in the transmission 140. The illustrative aspirator 130 includes a case 232 that houses various components included in the aspirator 130 and an exhaust duct 234 integrally formed with the case 232 that is shaped to conduct accumulated debris AD therethrough for exhaustion in use of the aspirator 130. The exhaust 134 is illustratively embodied as, or otherwise includes, the exhaust duct 234. In the illustrative embodiment, the case 232 is directly attached to a planar outer face 244 of the main housing 242 so that the exhaust duct 234 extends away from the main housing 242 to facilitate exhaustion of accumulated debris AD through the exhaust duct 234 away from the main housing 232 in use of the drive system 100.

In the illustrative embodiment, the aspirator case 232 is attached to the transmission main housing 242 such that the aspirator 130 is spaced from the output shaft 262, an interface 250 that corresponds to, or is otherwise associated with, the one or more auxiliary devices 160, the intake 112, and the exhaust 114 (note that the drive unit 110 is positioned in front of the main housing 242 such that the intake 112 and the exhaust 114 are obscured by the main housing 242). As such, the aspirator 130 does not physically interfere with output shaft 262, the interface 250, the intake 112, or the exhaust 114. Put another way, the case 232 is directly attached to the main housing 242 to minimize physical interference between the aspirator 130 and the one or more blowers 162, the one or more auxiliary devices 160, the intake 112, and the exhaust 114.

In the illustrative embodiment, attachment of the aspirator case 232 to the transmission main housing 242 facilitates lubrication of various components of the aspirator 130 using lubricant stored and circulated within the main housing 242. That is, internal splash lubrication mechanisms provided by the main housing 242 may be used to supply lubricant to components of the aspirator 130 as needed during operation of the drive system 100.

Figure 3:
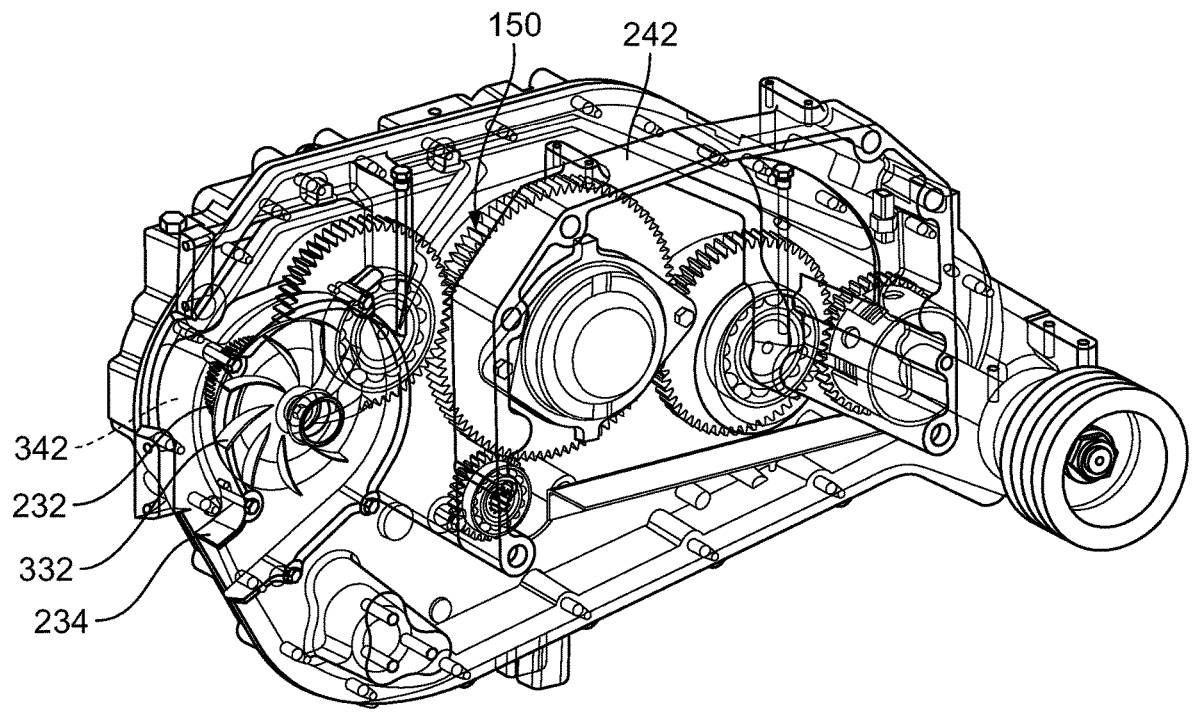
FIG. 3 is a perspective view similar to FIG. 2 of components housed in the main housing and contained in the case.

Referring now to FIG. 3, portions of the main housing 242 and the case 232 are made transparent to show the components housed thereby. The gear train 150 of the transmission 140 is illustratively housed by the main housing 242. The one or more rotors 132 of the aspirator 130 are illustratively housed by the case 232. In the illustrative embodiment, the one or more rotors 132 include only one rotor 332. Additionally, in the illustrative embodiment, the one or more aspirator drivers 142 include only one aspirator driver 342 configured to drive rotation of the one rotor 332 in use of the drive system 100.

Figure 4:
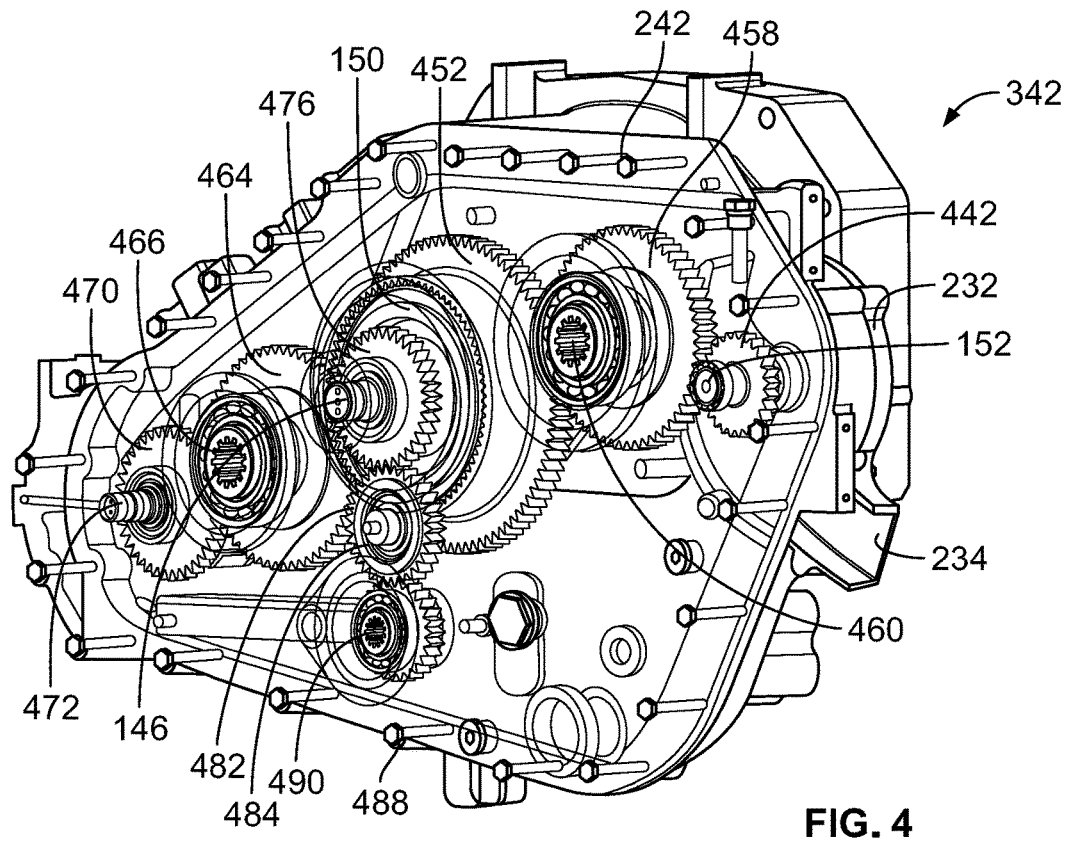
FIG. 4 is another perspective view of at least some of the components shown in FIG. 3.
Figure 5:
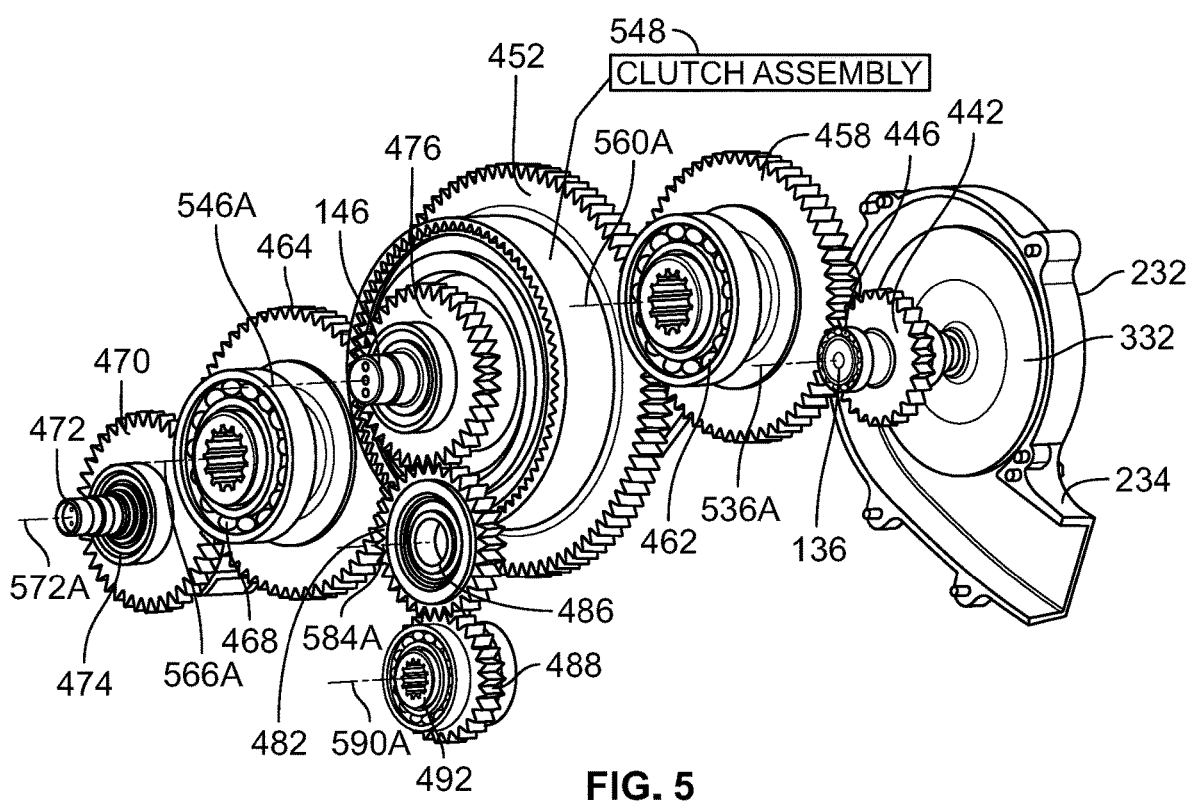
FIG. 5 is a perspective view similar to FIG. 4 of the transmission components housed in the main housing and the aspirator components contained in the case, with the main housing omitted for the sake of simplicity.

Referring now to FIGS. 4 and 5, the illustrative gear train 150 includes a central or input gear 452, a gear 458 intermeshed with the central gear 452 and the aspirator gear 442 included in the one aspirator driver 342, a gear 464 intermeshed with the central gear 452 and a gear 470, a gear 476, a gear 482 intermeshed with the gear 476, and a gear 488 intermeshed with the gear 482. In the illustrative embodiment, each of the gears 452, 458, 442, 464, 470, 476, 482, 488 is embodied as, or otherwise includes, a spur or straight-cut gear. However, it should be appreciated that in other embodiments, each of the gears 452, 458, 442, 464, 470, 476, 482, 488 may be embodied as, or otherwise include, another suitable gear.

The central gear 452 is illustratively supported on the transmission input shaft 146. Like the transmission input shaft 146, the central gear 452 is configured for rotation about an input axis 546A. In some embodiments, the central gear 452 may be configured for common rotation with the transmission input shaft 146 about the input axis 546A. In other embodiments, however, the central gear 452 may be supported for rotation about the input axis 546A relative to the transmission input shaft 146 by a bearing.

The gear 458 is illustratively supported on a shaft 460. Like the shaft 460, the gear 458 is configured for rotation about an axis 560A that is spaced from the input axis 546A. The gear 458 is supported for rotation about the axis 560A relative to the shaft 460 by a bearing 462. In other embodiments, however, the gear 458 may be configured for common rotation with the shaft 460 about the axis 560A. In any case, the gear 458 is arranged between the central gear 452 and the aspirator gear 442.

The aspirator gear 442 is illustratively supported on the aspirator input shaft 136. Like the aspirator input shaft 136, the aspirator gear 442 is configured for rotation about an axis 536A that is spaced from the axis 560A and the input axis 546A. The aspirator gear 442 is supported for rotation about the axis 536A by a bearing 446. In other embodiments, however, the aspirator gear 442 may be configured for common rotation with the aspirator input shaft 136 about the axis 536A. In any case, rotation of the aspirator gear 442 in use of the transmission 140 drives rotation of the aspirator input shaft 136. Because the rotor 132 is supported on the aspirator input shaft 136 for rotation therewith, rotation of the input shaft 136 drives rotation of the rotor 132 about the axis 536A to draw accumulated debris AD away from the cleaner unit 120 in use of the drive system 100.

The gear 464 is illustratively supported on a shaft 466. Like the shaft 466, the gear 464 is configured for rotation about an axis 566A that is spaced from the input axis 546A, the axis 560A, and the axis 536A. The gear 464 is supported for rotation about the axis 566A relative to the shaft 466 by a bearing 468. In other embodiments, however, the gear 464 may be configured for common rotation with the shaft 466 about the axis 566A. In any case, the gear 464 is arranged between the central gear 452 and the gear 470.

The gear 470 is illustratively supported on a shaft 472. Like the shaft 472, the gear 470 is configured for rotation about an axis 572A that is spaced from the input axis 546A, the axis 560A, the axis 536A, and the axis 566A. The gear 470 is supported for rotation about the axis 572A relative to the shaft 472 by a bearing assembly 474. In other embodiments, however, the gear 470 may be configured for common rotation with the shaft 472 about the axis 572A.

The gear 476 is illustratively supported on the transmission input shaft 146 and configured for rotation about the input axis 546A. The gear 476 is spaced from the central gear 452 along the input axis 546A. In some embodiments, the gear 476 may be configured for common rotation with the transmission input shaft 146 about the input axis 546A. In other embodiments, however, the gear 476 may be supported for rotation about the input axis 546A relative to the transmission input shaft 146 by a bearing.

The gear 482 is illustratively supported on a shaft 484. Like the shaft 484, the gear 482 is configured for rotation about an axis 584A that is spaced from the input axis 546A, the axis 560A, the axis 536A, the axis 566A, and the axis 572A. The gear 482 is supported for rotation about the axis 584A relative to the shaft 484 by a bearing assembly 486. In other embodiments, however, the gear 482 may be configured for common rotation with the shaft 484 about the axis 584A. In any case, the gear 482 is arranged between the gear 476 and the gear 488.

The gear 488 is illustratively supported on a shaft 490. Like the shaft 490, the gear 488 is configured for rotation about an axis 590A that is spaced from the input axis 546A, the axis 560A, the axis 536A, the axis 566A, the axis 572A, and the axis 584A. The gear 488 is supported for rotation about the axis 590A relative to the shaft 490 by a bearing 492. In other embodiments, however, the gear 488 may be configured for common rotation with the shaft 490 about the axis 590A.

In the illustrative embodiment, the one or more clutches 148 include a clutch assembly 548 that extends around the input axis 546A. When the drive system 100 and the transmission 140 are in one operating mode, the clutch assembly 548 is engageable (i.e., in an engaged state) such that rotation of the central gear 452 about the input axis 546A drives rotation of the aspirator gear 442 about the axis 536A through the gear 458 to cause rotation of the rotor 132 about the axis 536A. As further explained below with reference to FIG. 9, the one operating mode may correspond to, or otherwise be associated with, a runtime mode of the illustrative drive system 100. When the drive system 100 and the transmission 140 are in another operating mode, the clutch assembly 548 is disengageable (i.e., in a disengaged state) such that the aspirator gear 442 does not drive rotation of the rotor 132 about the axis 536A. As further explained below with reference to FIG. 9, the another operating mode may correspond to, or otherwise be associated with, a startup mode of the illustrative drive system 100.

Figure 6:
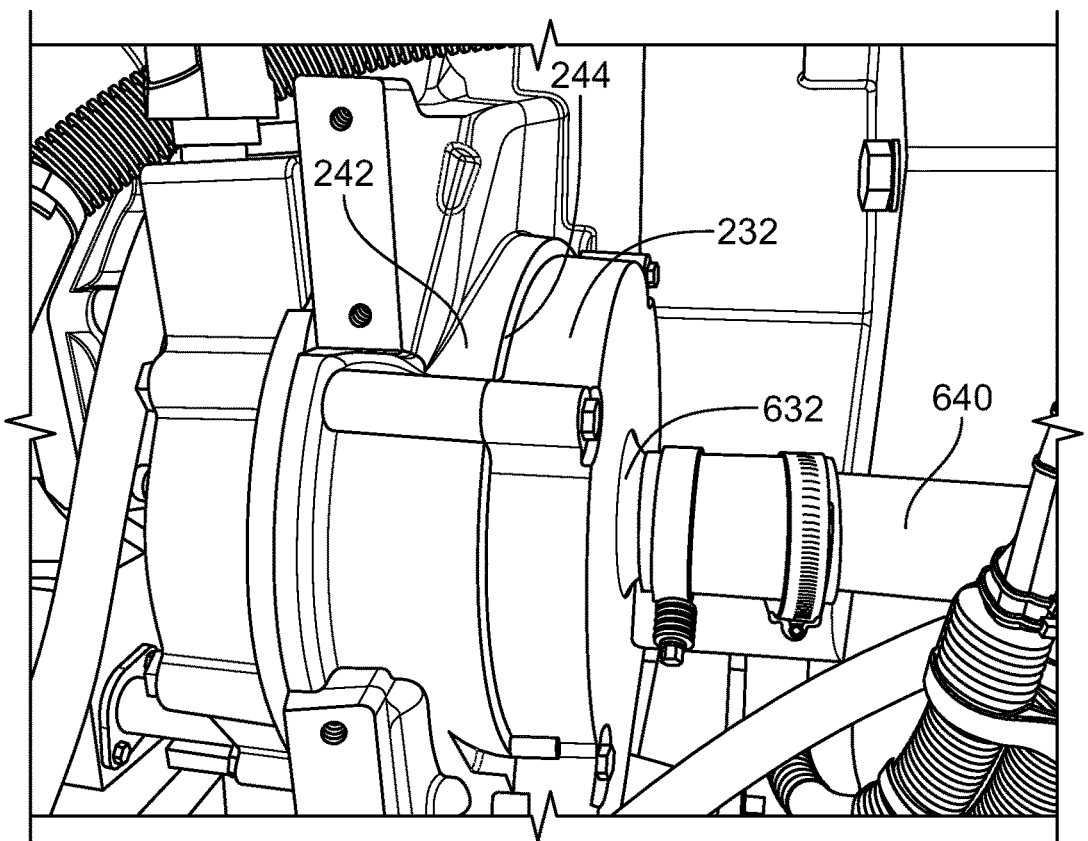
FIG. 6 is a perspective view of the case shown in FIG. 2 with a hose attached thereto.

Referring now to FIG. 6, a supply port 632 formed in the case 232 of the aspirator 130 is fluidly coupled to the cleaner unit 120 (not shown in FIG. 6) by a hose 640. In use of the drive system 100, rotation of the rotor 132 draws accumulated debris AD away from the cleaner unit 120 and into the aspirator 130 through the hose 640. Accumulated debris AD drawn into the aspirator 130 is exhausted via the exhaust duct 234 as described below with reference to FIG. 7. It should be appreciated that the hose 640 may be embodied as, or otherwise include, one or more pipes, tubes, conduits, distribution chambers, manifolds, plenums, or the like. Furthermore, it should be appreciated that in lieu of the hose 640, another suitable device may be used to fluidly couple the cleaner unit 120 to the aspirator 130.

Figure 7:
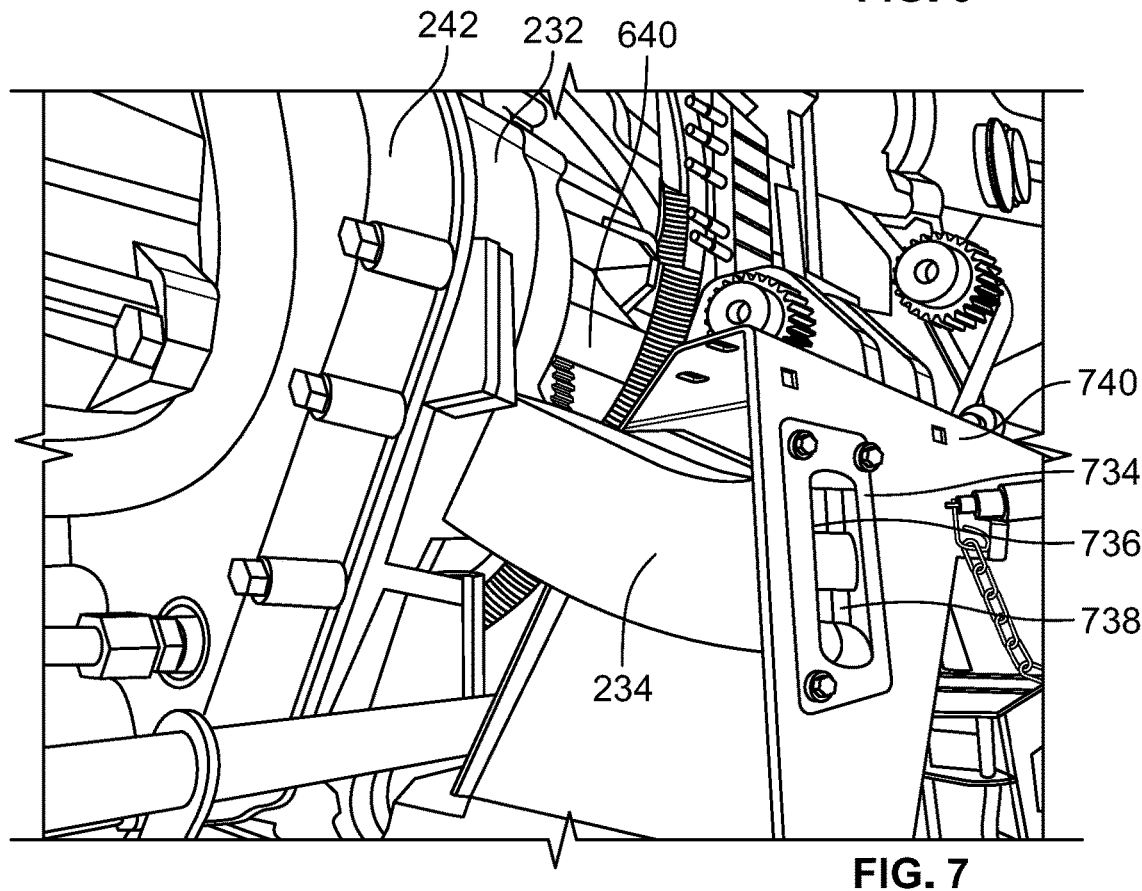
FIG. 7 is a perspective view of the case shown in FIG. 2 with an exhaust duct integrally formed therewith mounted to a stationary component.

Referring now to FIG. 7, the exhaust duct 234 of the aspirator 130 illustratively includes a mount 734 that is received by, and secured to, a stationary component 740 positioned outside of the drive system 100. As such, in use of the drive system 100, accumulated debris AD drawn into the aspirator 130 in response to rotation of the rotor 132 is exhausted through exhaust ports 736, 738 of the exhaust duct 234 outside of the drive system 100. It should be appreciated that air exhausted via the exhaust duct 234 in use of the drive system 100 may be used for a variety of purposes, such as cleaning or blowing-off surfaces of equipment located outside of the drive system 100, for example.

Figure 8:
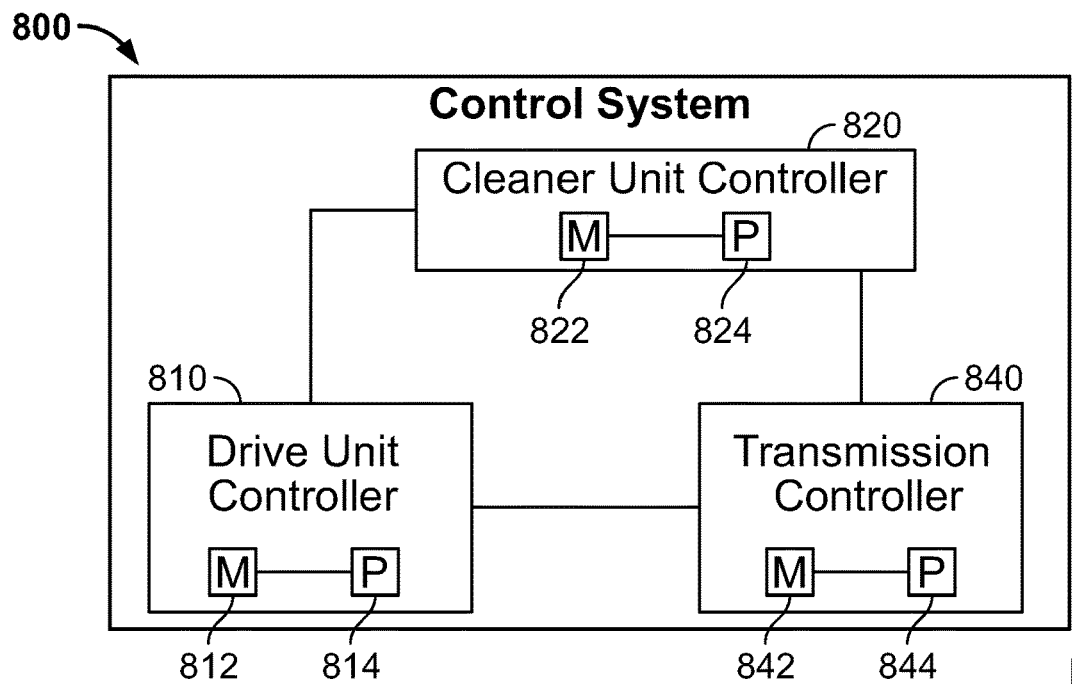
FIG. 8 is a diagrammatic view of a control system that may be used to control operation of the drive system of FIG. 1.

Referring now to FIG. 8, an illustrative control system 800 is configured to control operation of the drive system 100. As described below, the control system 800 includes controllers 810, 820, 840 that are configured to control operation of the drive unit 110, the cleaner unit 120, and the transmission 140, respectively. However, it should be appreciated that in other embodiments, the control system 800 may include a single controller that controls operation of the drive unit 110, the cleaner unit 120, and the transmission 140. In the illustrative embodiment, the control system 800 does not include a controller for the aspirator 130. However, it should be appreciated that in other embodiments, the control system 800 may include a controller dedicated to the aspirator 130.

In the illustrative embodiment, the control system 800 includes the controller 810 that is configured to control operation of the drive unit 110. The illustrative controller 810 is communicatively coupled to each of the controllers 820, 840. The controller 810 includes memory 812 and one or more processors 814 coupled to the memory 812.

In the illustrative embodiment, the control system 800 includes the controller 820 that is configured to control operation of the cleaner unit 120. The illustrative controller 820 is communicatively coupled to each of the controllers 810, 840. The controller 820 includes memory 822 and one or more processors 824 coupled to the memory 822.

In the illustrative embodiment, the control system 800 includes the controller 840 that is configured to control operation of the transmission 140. The illustrative controller 840 is communicatively coupled to each of the controllers 810, 820. The controller 840 includes memory 842 and one or more processors 844 coupled to the memory 842.

In the illustrative embodiment, each of the memory 812, 822, 842 includes one or more memory devices. Each memory device 812, 822, 842 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). In some embodiments, each memory device 812, 822, 842 may be embodied as a block addressable memory, such as those based on NAND or NOR technologies. Each memory device 812, 822, 842 may also include future generation nonvolatile devices or other byte addressable write-in-place nonvolatile memory devices. Additionally, in some embodiments, each memory device 812, 822, 842 may be embodied, or otherwise include, a memory device that uses chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. Each memory device 812, 822, 842 may refer to the die itself and/or to a packaged memory product. In some embodiments still, 3D crosspoint memory may comprise a transistor-less stackable cross point architecture in which memory cells sit at the intersection of word lines and bit lines and are individually addressable and in which bit storage is based on a change in bulk resistance. In some embodiments yet still, all or a portion of each memory device 812, 822, 842 may be integrated into the respective processor(s) 814, 824, 844. Regardless, each memory device 812, 822, 842 may store various software and data used during operation such as task request data, kernel map data, telemetry data, applications, programs, libraries, and drivers.

In the illustrative embodiment, the processor(s) 814, 824, 844 may each include one or more processors. Each processor 814, 824, 844 may be embodied as any type of processor or other compute circuit capable of performing various tasks such as compute functions and/or controlling the respective functions of the drive unit 110, the cleaner unit 120, and the transmission 140 depending on, for example, the type or intended functionality of the drive unit 110, the cleaner unit 120, and the transmission 140. In some embodiments, each processor 814, 824, 844 may be embodied as a single or multi-core processor, a microcontroller, or other processing/controlling circuit. Additionally, in some embodiments, each processor 814, 824, 844 may be embodied as, include, or be coupled to an FPGA, an application specific integrated circuit (ASIC), reconfigurable hardware or hardware circuitry, or other specialized hardware to facilitate performance of the functions described herein. In some embodiments still, each processor 814, 824, 844 may be embodied as a high-power processor, an accelerator co-processor, an FPGA, or a storage controller.

Figure 9:
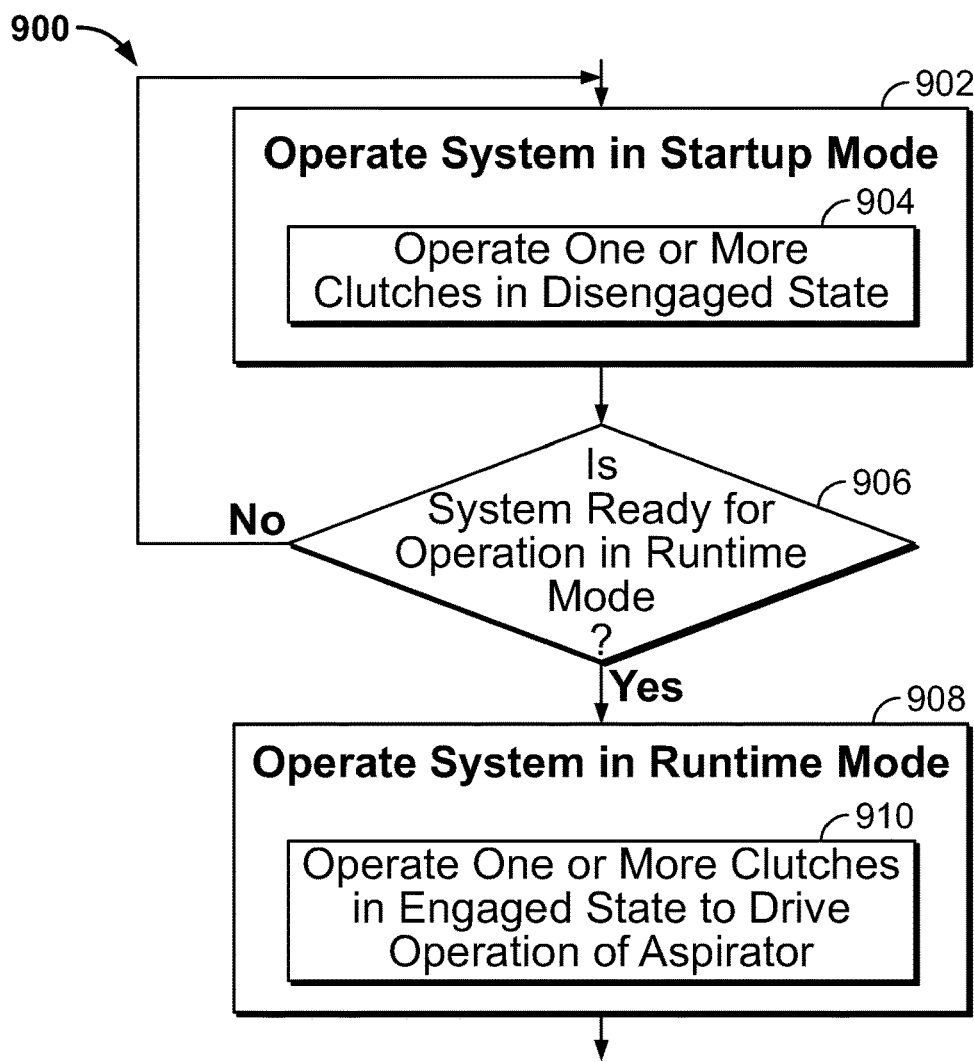
FIG. 9 is a simplified block diagram of a method of operating the drive system that may be performed by the control system of FIG. 8.

Referring now to FIG. 9, in the illustrative embodiment, the control system 800 may be configured to execute a method 900 for operating the drive system 100. In doing so, the controllers 810, 820, 840 may cooperate with one another to perform various tasks and/or control various functions of the drive system 100. It should be appreciated that the blocks of the method 900 described below may be embodied as, or otherwise included in, instructions stored in one or more of the memory 812, 822, 842 that are executable by one or more of the processors 814, 824, 844. Moreover, although the method 900 is described below with regard to the illustrative FIG. 9 in which the blocks of the method 900 are shown in an illustrative format and sequence, it should be appreciated that the method 900 is not limited to the particular sequence of blocks illustrated in FIG. 9. Additionally, it should be appreciated that in other embodiments, some of the blocks of the method 900 may be performed in parallel, or otherwise contemporaneously with, other blocks and/or performed in an alternative sequence. Finally, it should be appreciated that the method 900 may incorporate blocks in addition to those illustrated in FIG. 9.

The illustrative method 900 begins with block 902. In block 902, the control system 800 operates the drive system 100 in a startup mode. The startup mode may be embodied as, or otherwise include, an operating mode in which one or more components of the drive system 100 are powered on or activated after being powered down or inactivated for a period of time. Additionally, the startup mode may be associated with, or otherwise characterized by, one or more operational parameters of the drive unit 110, the cleaner unit 120, and the transmission 140, such as one or more speed ratios, output torque values, rotational speed values, mass flow rates, volumetric flow rates, accumulated debris AD quantities, time periods of operation, or the like, for example. In any case, to perform block 902, the control system 800 performs block 904. In block 904, the control system 800 operates the one or more clutches 148 (i.e., the clutch assembly 548) in a disengaged state such that the aspirator gear 442 does not drive rotation of the rotor 132 about the axis 536A, as indicated above. Consequently, when the drive system 100 is in the startup mode in block 902, the drive unit 110 does not drive operation of the aspirator 130 through the transmission 140, which may reduce the parasitic starting load experienced by the drive unit 110 compared to other configurations, at least in some embodiments. The method 900 subsequently proceeds from block 904 to block 906.

In block 906 of the illustrative method 900, the control system 800 determines whether the drive system 100 is ready for operation in the runtime mode. The runtime mode may be embodied as, or otherwise include, an operating mode subsequent to the startup mode in which one or more components of the drive system 100 have been activated for a reference period of time. Additionally, the runtime mode may be associated with, or otherwise characterized by, one or more reference thresholds of the drive unit 110, the cleaner unit 120, and the transmission 140, such as references thresholds for one or more speed ratios, output torque values, rotational speed values, mass flow rates, volumetric flow rates, accumulated debris AD quantities, time periods of operation, or the like, for example. Therefore, to determine whether the drive system 100 is ready for operation in the runtime mode in block 906, the control system 800 may compare one or measured operational parameters of the drive unit 110, the cleaner unit 120, and the transmission 140 to one or more reference thresholds corresponding to, or otherwise associated with, the runtime operating mode. In any case, if the control system 800 determines that the drive system 100 is ready for operation in the runtime mode, the method 900 subsequently proceeds to block 908.

In block 908 of the illustrative method 900, the control system 800 operates the system 100 in runtime mode. To do so, the control system 800 performs block 910. In block 910, the control system 800 operates the one or more clutches 148 (i.e., the clutch assembly 548) in an engaged state such that rotation of the central gear 452 about the input axis 546A drives rotation of the aspirator gear 442 about the axis 536A through the gear 458 to cause rotation of the rotor 132 about the axis 536A, as indicated above. Consequently, when the drive system 100 is in the runtime mode in block 908, the drive unit 110 drives operation of the aspirator 130 through the transmission 140. In some embodiments, performance of the block 908 corresponds to, or is otherwise associated one, performance of one iteration of the illustrative method 900.

Returning to block 906 of the illustrative method 900, if the control system 800 determines that the drive system 100 is not ready for operation in the runtime mode, the method 900 proceeds to block 902.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A system for a harvesting machine, the system comprising:
   a drive unit configured to produce rotational power in use of the system;
   a cleaner unit fluidly coupled to the drive unit, wherein the cleaner unit is configured to separate debris from air so that the air becomes cleaned air and provide the cleaned air to the drive unit in use of the system;
   an aspirator fluidly coupled to the cleaner unit, wherein the aspirator is configured to draw debris away from the cleaner unit and exhaust the debris in use of the system, and wherein the aspirator includes a shaft that extends along a central axis and a rotor supported on the shaft that is configured for rotation about the central axis to draw the debris away from the cleaner unit; and
   a transmission coupled to the drive unit and the aspirator to receive rotational power produced by the drive unit and provide the rotational power to the aspirator, wherein the transmission includes an aspirator driver configured to drive operation of the aspirator at a fixed speed ratio in use of the system.

2. The system of claim 1, wherein the aspirator driver includes an aspirator gear coupled to the shaft to drive rotation of the rotor about the central axis in use of the system.

3. The system of claim 2, wherein the transmission includes an input shaft coupled to the drive unit to receive rotational power produced by the drive unit, a first gear supported on the input shaft, and a second gear arranged between the first gear and the aspirator gear.

4. The system of claim 3, wherein the aspirator gear is intermeshed with the second gear.

5. The system of claim 4, wherein the second gear is intermeshed with the first gear.

6. The system of claim 5, wherein the system is operable in a first operating mode in which rotation of the first gear drives rotation of the aspirator gear through the second gear to cause rotation of the rotor about the central axis.

7. The system of claim 6, wherein the system is operable in a second operating mode in which the aspirator gear does not drive rotation of the rotor about the central axis.

8. The system of claim 1, comprising a main housing that houses the transmission, wherein the aspirator includes a case and an exhaust duct integrally formed with the case, and wherein the case is directly attached to the main housing to facilitate exhaustion of the debris through the exhaust duct away from the main housing in use of the system.

9. The system of claim 8, wherein the case is directly attached to the main housing to minimize physical interference between the aspirator and one or more auxiliary components that may be driven by the drive unit.

10. The system of claim 1, wherein the aspirator driver is beltless.

11. The system of claim 10, wherein the aspirator driver is configured to drive operation of the aspirator at a fixed speed ratio in use of the system without one or more auxiliary pads.

12. A transmission for a harvesting machine, the transmission comprising:
   an input shaft configured to receive rotational power produced by a drive unit, wherein the input shaft is configured for rotation about an input axis in use of the transmission;
   an output shaft configured to transmit rotational power received by the input shaft to an aspirator to drive rotation thereof, wherein the output shaft is configured for rotation about an output axis in use of the transmission, and wherein the output axis is spaced from the input axis;
   a first gear supported on the input shaft and configured for rotation about the input axis in use of the transmission;

a second gear configured for rotation about a second axis in use of the transmission, wherein the second axis is spaced from the input axis and the output axis; and a third gear supported on the output shaft and configured for rotation about the output axis to drive rotation of the aspirator in use of the transmission.

13. The transmission of claim 12, wherein the second gear and the third gear are intermeshed.

14. The transmission of claim 13, wherein the first gear and the second gear are intermeshed.

15. The transmission of claim 14, wherein the transmission is operable in a first operating mode in which rotation of the first gear about the input axis drives rotation of the third gear about the output axis through the second gear to drive rotation of the aspirator.

16. The transmission of claim 15, wherein the transmission is operable in a second operating mode in which the third gear does not drive rotation of the aspirator.

17. The transmission of claim 16, wherein the first operating mode is a runtime operating mode of the transmission and the second operating mode is a startup operating mode of the transmission.

18. A method of operating a system for a harvesting machine that includes a drive unit configured to produce rotational power, a cleaner unit fluidly coupled to the drive unit and configured to separate debris from air so that the air becomes cleaned air and provide the cleaned air to the drive unit, an aspirator fluidly coupled to the cleaner unit and configured to draw debris away from the cleaner unit and exhaust the debris, and a transmission coupled to the drive unit and the aspirator to receive rotational power produced by the drive unit and provide the rotational power to the aspirator, the method comprising:

operating the system in a startup mode; and operating the system in a runtime mode after operating the system in the startup mode, wherein operating the system in the runtime mode includes driving operation of the aspirator by an aspirator gear of the transmission at a fixed speed ratio.

19. The method of claim 18, wherein the transmission includes a first gear supported on an input shaft, the aspirator gear supported on an output shaft that is spaced from the input shaft, and a second gear arranged between the first gear and the aspirator gear, and wherein operating the system in the runtime mode includes operating the system such that the first gear drives rotation of the aspirator gear through the second gear to drive operation of the aspirator.

20. The method of claim 19, wherein operating the system in the startup mode includes operating the system such that the aspirator gear does not drive operation of the aspirator.

* * * * *